(12) United States Patent
Foster

(10) Patent No.: US 6,332,134 B1
(45) Date of Patent: Dec. 18, 2001

(54) FINANCIAL TRANSACTION SYSTEM

(76) Inventor: Chuck Foster, P.O. Box 3568, Yountville, CA (US) 94599

( * ) Notice: Subject to any disclaimer, the term of this patent is extended or adjusted under 35 U.S.C. 154(b) by 0 days.

(21) Appl. No.: 09/522,333

(22) Filed: Mar. 9, 2000

Related U.S. Application Data
(60) Provisional application No. 60/174,299, filed on Jan. 3, 2000, and provisional application No. 60/162,651, filed on Nov. 1, 1999.

(51) Int. Cl.⁷ .................................................. G06F 17/00
(52) U.S. Cl. ................................................ 705/39; 705/36
(58) Field of Search ........................................... 705/39

(56) References Cited

U.S. PATENT DOCUMENTS

| | | | |
|---|---|---|---|
| 5,465,206 | * 11/1995 | Hilt et al. | 705/39 |
| 5,602,918 | * 2/1997 | Chen et al. | 705/38 |
| 5,621,797 | * 4/1997 | Rosen | 705/39 |
| 5,671,279 | * 9/1997 | Elgamal | 705/39 |
| 5,671,280 | * 9/1997 | Rosen | 705/39 |
| 5,704,046 | * 12/1997 | Hogan | 705/39 |
| 5,715,399 | * 2/1998 | Bezos | 705/39 |
| 5,727,163 | * 3/1998 | Bezos | 705/38 |
| 5,732,400 | * 3/1998 | Mandler et al. | 705/39 |
| 5,745,886 | * 4/1998 | Rosen | 705/39 |
| 5,757,917 | * 5/1998 | Rose et al. | 705/39 |
| 5,758,327 | * 5/1998 | Gardner et al. | 705/38 |
| 5,787,403 | * 7/1998 | Randle | 705/43 |
| 5,790,677 | * 8/1998 | Fox et al. | 705/19 |
| 5,822,737 | * 10/1998 | Ogram | 705/39 |
| 5,826,241 | * 10/1998 | Stein et al. | 705/39 |
| 5,839,119 | * 11/1998 | Krsul et al. | 705/39 |
| 5,878,139 | * 3/1999 | Rosen | 705/38 |
| 5,883,810 | * 3/1999 | Franklin et al. | 364/479.02 |
| 5,890,137 | * 3/1999 | Koreeda | 705/39 |
| 5,940,811 | * 8/1999 | Norris | 705/38 |
| 5,949,044 | * 9/1999 | Walker et al. | 705/38 |
| 5,952,638 | * 9/1999 | Demers et al. | 705/39 |

(List continued on next page.)

FOREIGN PATENT DOCUMENTS

1089242  * 9/1999  (WO) .............................. G07F/17/16

OTHER PUBLICATIONS

"Internet Commerce Security" BYTE Magazine (May, 1997) Caroll M.*
Gifford et al., "Payment Switches for Open Networks", USENIX Workshop on Electronic Commerce, pp. 1–9 (Jul. 1995).*
Bellare et al., "iKP—A Family of Secure Electronic Payment Protocols, Extended Abstract", http://www.zurich.ibm.co./Technology/Security/extern/ecommerce/, 3 pages (Aug. 2, 1995).*
Udo Flohr, "Electric Money", BYTE Magazine—www.byte.com/art/9705/sec17/art.html, pp. 74–84 (Jun. 1996).*
Mark Carroll, "Internet—Commerce Security", BYTE Magazine, pp. 1–5 (May 1997).*

Primary Examiner—Vincent Millin
Assistant Examiner—Geoffrey Akers
(74) Attorney, Agent, or Firm—Townsend and Townsend and Crew LLP

(57) ABSTRACT

A financial transaction system. The present invention includes a method for performing a financial transaction, wherein a cardholder makes a purchase from a merchant using credit established at a financial institution. The method begins when the merchant transmits a merchant offer including merchant information about the purchase to the cardholder. The cardholder transmits the merchant information along with cardholder information to the financial institution. The financial institution then transmits payment for the purchase to a merchant account and sends a payment notification to the merchant indicating that payment for the purchase has been made and that the merchant offer has been accepted.

39 Claims, 14 Drawing Sheets

U.S. PATENT DOCUMENTS

| | | | |
|---|---|---|---|
| 5,956,699 | * 9/1999 | Wong et al. | 705/39 |
| 5,960,411 | * 9/1999 | Hartman et al. | 705/30 |
| 5,987,140 | * 11/1999 | Rowney et al. | 705/30 |
| 5,991,750 | * 11/1999 | Watson | 705/38 |
| 5,996,076 | * 11/1999 | Rowney et al. | 705/39 |
| 5,999,596 | * 12/1999 | Walker et al. | 705/39 |
| 6,000,832 | * 12/1999 | Franklin et al. | 364/479 |
| 6,002,767 | * 12/1999 | Kramer | 705/39 |
| 6,049,785 | * 4/2000 | Gifford | 705/39 |
| 6,169,974 | * 1/2001 | Baumgartner et al. | 705/39 |

* cited by examiner

| | | |
|---|---|---|
| CardFort Merchant I.D. | 123456789 | —1202 |
| Invoice Number | 6577 | —1204 |
| Purchase Amount | 577.98 | —1206 |
| Transaction Date | 6/14/1999 | —1208 |
| Merchant OVTR | acme@merchant.com | —1210 |

| | | |
|---|---|---|
| CardFort Cardholder I.D. | 987654321 | —1222 |
| Cardholder OVTR | buyer@customer.com | —1224 |
| CardFort Merchant I.D. | 123456789 | —1202 |
| Invoice Number | 6577 | —1204 |
| Purchase Amount | 577.98 | —1206 |
| Transaction Date | 6/14/1999 | —1208 |
| Merchant OVTR | acme@merchant.com | —1210 |

| | | |
|---|---|---|
| Invoice Number | 6577 | —1204 |
| Purchase Amount | 577.98 | —1206 |
| Transaction Date | 6/14/1999 | —1208 |
| Shipping Name | John Smith | —1232 |
| Shipping Address | 345 Silver Ave | —1234 |
| Shipping City | Fosterville | —1236 |
| Shipping State | CA | —1238 |
| Shipping Zip | 94999 | —1240 |

| | | |
|---|---|---|
| Invoice Number | 6577 | —1204 |
| Purchase Amount | 577.98 | —1206 |
| Transaction Date | 6/14/1999 | —1208 |
| Shipping Name | | |
| Shipping Address | | |
| Shipping City | | } 1243 |
| Shipping State | | |
| Shipping Zip | | |
| Shipper | UPS | —1241 |

CardFort Purchase Log 1300

[ Find Report ]  [ Find All ]

| Date 1302 | Company Name 1304 | Total 1306 | URL 1308 | eMail 1310 | Transaction # 1312 |
|---|---|---|---|---|---|
| 1/11/1998 | Travel Source | $2151.95 | http://www.go-travel.com | reservations@go-travel.com | 3488 366 1/11/98 |
| 9/29/1998 | Satillite Photos | $545.00 | http://www.sky_pix.com | sales@sky_pix.com | 3516 345 9/29/98 |
| 1/10/1998 | Barns & Hope | $403.47 | http://www.barns.hope.com | clothes@barns.hope.com | 3543 362 1/10/98 |
| 10/27/1998 | Book Swamp | $142.90 | http://www.swamp.com | order@swamp.com | 3551 354 10/27/98 |
| 7/23/1998 | D V Vineyards | $234.85 | http://www.chardonnay.com | wine@chardonnay.com | 3564 381 7/23/98 |
| 7/6/1998 | Roofing Co. Inc. | $599.50 | http://www.roofing.com | sales@roofing.com | 3585 379 7/6/98 |

ELECTRONIC SHOPPING CART

Merchant Name: Acme Inc. **

Merchant CardFort ID: 123456789 ** } 1402

Merchant Telephone: (800) 555-5555 **

| 1/10/1999 | ABC112 |
| Order Date | Order Number |

| QUANTITY | ITEM NO. | DESCRIPTION | PRICE/UNIT | AMOUNT |
|---|---|---|---|---|
| 1 | 454-Md | Ladies Safari - Tan | $94.00 | $94.00 |
| 2 | 586-Md | Ladies Polo - Blu | $38.00 | $76.00 |
| 2 | 658-Md | Ladies Puller - Blu | $68.49 | $136.98 |
| 1 | 587-Md | Ladies Collar - Wht | $68.49 | $68.49 |

1404

| Subtotal | $375.47 |
| Tax | $0.00 |
| Shipping | $28.00 |
| TOTAL | $403.47 |

1406

1408

BUY

** Denotes information entered by cardholder from paper catalog

*FIG. 14.*

FINANCIAL TRANSACTION SYSTEM

CROSS-REFERENCES TO RELATED APPLICATIONS

This application claims priority from co-pending U. S. Provisional Patent Application No. 60/162,651 filed Nov. 1, 1999. This application also claims priority from co-pending U.S. Provisional Patent Application No. 60/174,299 filed Jan. 3, 2000. Each of these applications are herein incorporated in their entirety herein for all purposes.

FIELD OF THE INVENTION

This invention relates to financial transaction systems, and more particularly, to a system for conducting financial transactions over a computer network.

BACKGROUND OF THE INVENTION

Financial transactions conducted via computers and computer networks are susceptible to fraud or theft of confidential financial information. Computer software engineers continuously strive to improve the security of computer systems in an effort to prevent theft and thereby calm users' fears. Various encryption schemes have been used to provide a layer of security for confidential information, however, for every effort toward increased security, new techniques are developed by hackers to break into encrypted information. Specifically, hackers want to steal credit card numbers and associated personal information.

FIG. 1 shows how a typical credit card transaction is conducted over the Internet. A credit cardholder (purchaser) 102, contacts a merchant's web site 104 over the Internet. The cardholder 102 makes a shopping selection from the merchant's web site as shown at 108. Next, the cardholder 102 provides the merchant with a valid credit card number and related personal information, such as expiration date, shipping address and so forth, as shown at 110.

The merchant 104 receives the cardholder's personal credit information and contacts the cardholder's credit card company 112 to charge the cost of the selected items, as shown at 114. If the charge against the credit card is successful, the merchant is notified and forwards an order confirmation 116 to the cardholder. The merchant then ships the selected goods to the cardholder. A short time later, the card company makes a payment to the merchant for the cost of the order as shown at 118. Finally, the card company provides a bill to the cardholder for the cost of the purchase and any accrued interest charges, as shown at 120.

In the above example, it is easy to see that the cardholder has provided confidential information over the Internet to the merchant. There is a risk when a cardholder transmits this information, since it may travel through several computer systems prior to reaching the merchant. This places the information at risk of being stolen. The merchant stores this information in its internal database, and at some point, the information may be used to generate mailing lists for future product offerings. To generate additional revenues, the merchant may sell all or a portion of the information to third parties. Even if the merchant tries to protect the information, the merchant's database is subject to unauthorized access, which may also put the cardholder's personal information at risk. Although some merchants may take steps to prevent unauthorized access to their internal databases, other merchants may not use adequate security measures. As a result, the cardholder's credit card number and other personal information may be compromised.

Organizing merchants worldwide to adopt consistent security measures has been largely unsuccessful. The secure electronic transaction (SET) protocol, while having promise, has been abandoned by key players in the industry. At this point in time, secure socket layer (SSL) is the fall back position, particularly on the Internet. Other "pre-Internet" problems continue to exist with regard to credit/debit cards. Employee theft, merchant fraud, recurring charges, and theft by others cause massive expense and hardship, such as with identity theft. These problems have had a chilling effect on electronic commerce. Reports estimate that 70%–80% of Internet purchases are left uncompleted. Either the cardholder backs out of the electronic transaction completely or telephones the company directly to verbally place the order.

The threshold for merchants to accept and process credit card purchases remains high. Merchants, for the most part, still rely on phone and fax orders. They must buy terminal software and subscribe to third party processing companies. Internet merchants pay the highest discount rates and are limited to methods of shipping that require a signature evidencing receipt. Additionally, Internet merchants are unsupported in charge back disputes, which may occur if a product is shipped to an address other than the credit card billing address.

SUMMARY OF THE INVENTION

The present invention includes a financial transaction system that solves the problem of security for consumer credit card information transmitted over the Internet. The financial transaction system reverses the process with regard to card transactions conducted via computers and computer networks. Instead of cardholders transmitting their card numbers to merchants, the system obtains merchant information and requests that the cardholder's own card company pay the merchant. The cardholder's credit card number never travels across the Internet. The merchant never learns of the cardholder's card number. In one embodiment, only a shipping address is disclosed to the merchant, which comes directly from the card company along with a notification that the payment has been made.

Multiple user identifiers (IDs) and passwords can be assigned to different people to obtain credit from the same credit card. For example, the cardholder's own employees can be authorized to use the cardholder's credit card and never have to know the card number. The cardholder can delete or change user IDs as employees come or go or as family members gain or lose privileges. The user IDs can also be used to associate purchases with one or more shipping addresses that are different from the cardholder's billing address.

When conducting transactions in accordance with the present invention, third party processing services are not needed. This eliminates multiple transmissions of personal credit card information across the network and the use of other vulnerable card number repositories having associated fees and staff.

The invention provides an opportunity for the card company to stop the transaction if either party is not validated, or if there is insufficient credit to cover the transaction. By inserting the card company at the front of the transaction process, many steps of the current transaction process are eliminated, including but not limited to, the steps of card verification by the merchant, address confirmation, payment submission, much of the charge back activity, and unauthorized merchant recurring charges.

In one embodiment of the present invention, a method is provided for performing a financial transaction, wherein a cardholder makes a purchase from a merchant using credit established at a financial institution. The method begins when the merchant transmits a merchant offer including information about the purchase to the cardholder. The cardholder transmits the merchant information along with cardholder information to the financial institution. The financial institution then transmits payment for the purchase to a merchant account and send a payment notification to the merchant indicating that payment for the item has been made and that the merchant offer has been accepted.

Another embodiment of the present invention includes apparatus for use by a cardholder for conducting a financial transaction between the cardholder and a merchant, wherein the cardholder makes a purchases from the merchant using credit established at a financial institution. The apparatus includes, means for selecting an item to be purchased from the merchant, means for receiving information about the selected item including a merchant identifier, means for combining information about the selected item and the merchant identifier with cardholder information including a cardholder identifier, wherein a request to pay is created, and means for transmitting the request to pay to the financial institution.

Another embodiment of the present invention includes a computer software product for use by a purchasing processor operated by a cardholder. The computer software product can be used to conduct a financial transaction between the cardholder and a merchant, wherein the cardholder makes a purchase from the merchant using credit established at a financial institution. The computer software product includes a medium readable by the purchasing processor and having stored thereon: a first sequence of instructions which, when executed by said purchasing processor, causes said purchasing processor to receive information about the purchase and a merchant identifier; and a second sequence of instructions which, when executed by said purchasing processor, causes said purchasing processor to transmit the information about the purchase, the merchant identifier and a cardholder identifier to the financial institution.

Another embodiment of the present invention uses a third party shipper to ship items from a merchant to a cardholder. The cardholder's card company provides notification to the merchant that payment for the purchase has been made and that a particular third party shipper will be used to ship the purchase to the cardholder. The card company also provides information to the third party shipper about the merchant and the purchase including a cardholder address. The shipper identifies the purchase to the merchant, who then provides the purchased items to the shipper. The shipper then ships the items to the cardholder at the cardholder address. During the transaction, the merchant is not provided with the identity of the cardholder or the cardholder shipping address, thereby further protecting cardholder information.

BRIEF DESCRIPTION OF THE DRAWINGS

FIG. 12A shows exemplary merchant transaction information;

FIG. 12B shows exemplary cardholder transaction information;

FIG. 12C shows exemplary card company transaction information;

FIG. 12D shows exemplary card company transaction information when using a third party shipper;

FIG. 13 shows an exemplary CardFort purchase log of transactions made using the financial transaction system in accordance with the present invention;

FIG. 14 shows an exemplary electronic shopping cart wherein a cardholder may enter goods for purchase from a merchant in accordance with the invention.

DESCRIPTION OF THE SPECIFIC EMBODIMENTS

Figure 1:
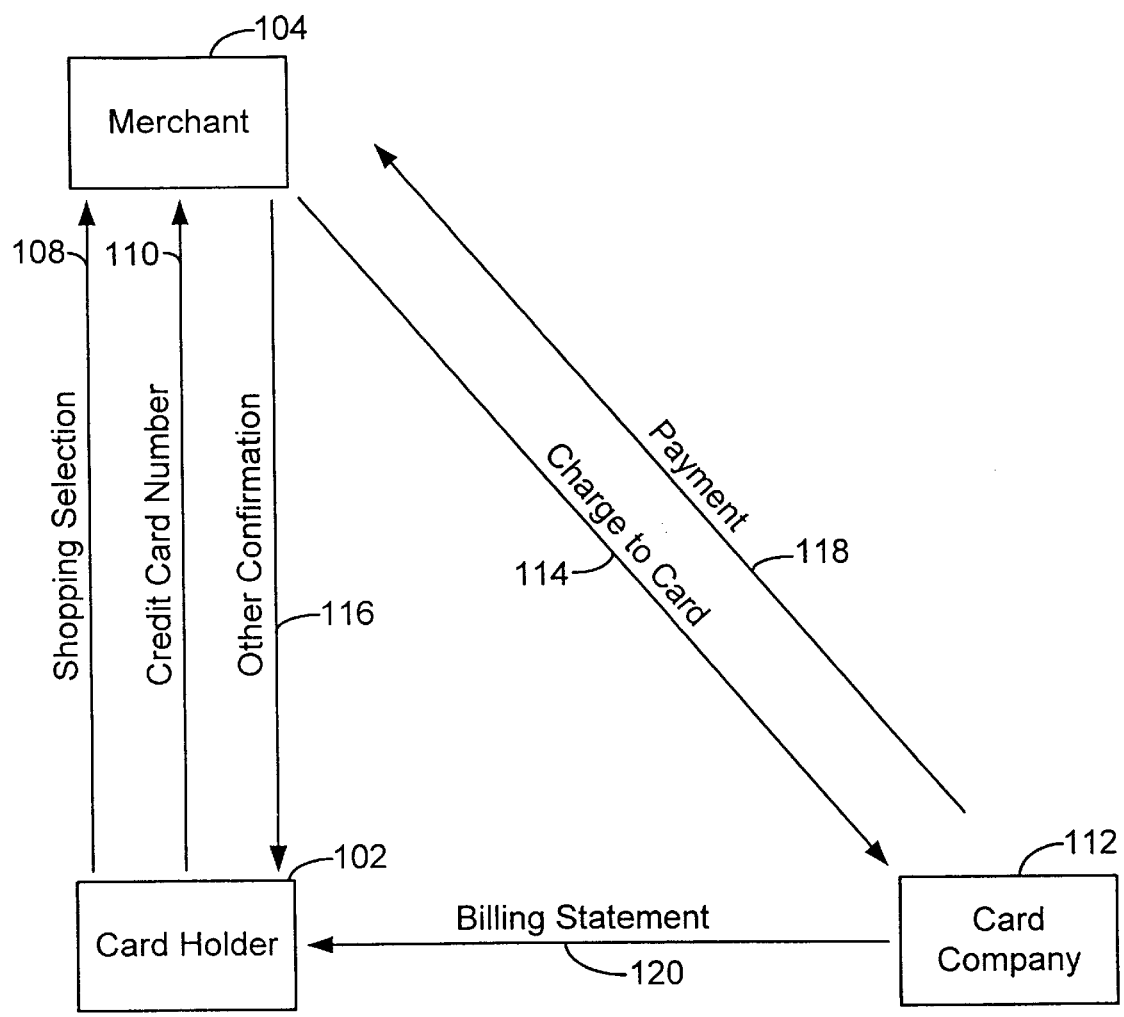
FIG. 1 shows how a typical credit card transaction is conducted over the Internet.

The present invention includes a financial transaction system (hereinafter "CardFort") that solves the problem of security for consumer credit card information transmitted over data networks, like the Internet. For convenience, references to the Internet are used herein, but embodiments of the invention are equally applicable to any type of data network. The financial transaction system reverses the process with regard to card transactions conducted over the Internet, so that credit card information is never transmitted over the Internet, and thus never outside the possession of the cardholder. The financial transaction system is suitable for use in any country and with any currency, since embodiments of the system allow financial institutions to effectuate currency exchange based on any existing exchange rates.

The following is a description of various elements of the CardFort system included in the present invention.

Participants

The participants in the CardFort system are the card company, the cardholder and the merchant. The card company is at the center of the CardFort system. The card company provides credit to the cardholder. For example, the card company may be a credit card company, a bank, a credit union, or other financial institution. The credit provided to the cardholder can be derived from any type of account, such as a credit card account, debit card account, a bank account, savings account, checking account or brokerage account. How credit is provided to the cardholder and the type of account the credit is based on is not essential to the present invention. Therefore, virtually any type of financial institution can provide credit to the cardholder based on any type of account without affecting the operation of embodiments of the present invention. As a matter of convenience, the credit provider will be referred to hereinafter as the card company and the person or entity receiving the credit will be referred to hereinafter as the cardholder.

The cardholder establishes an account with the card company to obtain credit which may be use to make financial transactions, such as when purchasing goods or paying invoices. The account established by the cardholder has associated confidential personal information, such as an account number and credit limit. The CardFort system operates to eliminate the transmission of such confidential information outside the control of the cardholder.

The merchant participates in the CardFort system by providing information about items to be purchased and by agreeing to be paid by the card company on behalf of the cardholder.

Cardholder Registration

A cardholder may register with the CardFort system by contacting the card company and requesting that one or more of the cardholder's accounts be available for use in the CardFort system. During cardholder registration, the cardholder receives CardFort software to install on the cardholder's computer. The software contains code that can be recognized by a registered merchant's website to allow a CardFort purchase. The software contains a changeable user password, a cardholder CardFort ID, a CardFort "Sales Log" database, dialing software, instructions, off-line catalog sites, and any miscellaneous promotions or data. The cardholder loads the software on his or her computer and follows step by step instructions culminating in clicking on a "Register Now" button. The software then dials the card company's toll free number, using the computer's modem, so that a registration process may be conducted. The cardholder's user ID and password is checked against the card company's records. At registration, a different password may be chosen. Multiple user IDs and passwords can be assigned to the same card number. An Order Verification Reply Target (OVRT) is provided by the cardholder, so that the card company can notify the cardholder of order confirmations or other information. If the card company chooses to, it can track the marketing effort that led to the registration. It is also possible for the cardholder to register by voice over the telephone, fax or mail, however, installing the computer software allows the cardholder to use the CardFort system when making purchases over data networks, like the Internet.

Merchant Registration

A merchant may register with the card company to use the CardFort system. During merchant registration, the merchant becomes authorized to accept payment utilizing the card company's instrument. For example, the card company and merchant may agree to use an Automatic Clearing House (ACH) to allow bank to bank transmission of funds to pay for merchant goods. Thus, a merchant invoice may be satisfied when the card company transfers funds to the ACH and then notifies the merchant of the transfer.

The merchant also registers as a CardFort website. As a CardFort website, the merchant receives computer software for its website that may contain brand logos, etc. and is capable of recognizing consumers browsing its website using the CardFort software. Optionally, a CardFort database may be provided to the merchant to receive non-Internet orders from consumers using off-line catalogs. A unique CardFort merchant identifier (ID) is issued and contained within the computer software given to the merchant.

Order Verification Reply Target (OVRT)

This is the preferred method and address for the cardholder to be notified that the transaction is complete, or if not, what if any problems exists. The notification can be an automated reply via email, fax, a real time protocol during the same connection or voice message. The merchant may also provide an OVRT to the card company to receive information relating to cardholder purchases.

Shipping Addresses

During the cardholder registration, a shipping address for the cardholder is provided. The shipping address indicates where items that are purchased by the cardholder are to be shipped. This can be different from the cardholder's billing address. The billing address indicates where the card company should send bills relating to the cardholder's credit account. In current types of financial transactions, the billing address is used as a part of the validation process, so that the merchant is exposed to a lack of support by the card company if a product is shipped to a different address. The CardFort allows, by use of the password and User ID, one or more alternative addresses to be used for specific purchases. This overcomes the problem of having a billing address that is different from the shipping address. For example, a P.O. Box may be used, or some other temporary address, so that for instance, a cardholder may purchase airline tickets while traveling or when making a purchase to send to another address as a gift.

CardFort Database

A history of all CardFort purchases is maintained in a CardFort database maintained on the cardholder's computer. This allows cardholders the convenience of determining information about what has been purchased, vender, price, etc. Also, the data is in a format (i.e. tab or comma separated data) that may be exportable to record keeping software such as Quicken, Excel, FileMaker Pro or any program that accepts data is such a format.

CardFort Software

The cardholders and merchants register to obtain a CardFort ID and password. The CardFort software installed on the cardholder's computer works in conjunction with well known browser programs to allow the cardholder to browse the Internet and make purchases using the CardFort system. The following is at least a part of the information that may be part of the installed software:

Plugins covering all the operating systems and browsers;
CardFort registration software;
CardFort database for logging purchases for the cardholder's use. The CardFort database also serves as the launch pad for data to the card company;
Instructions for registration;
Dialing string software for initial registration to direct toll free line;
Offline website/catalogs featuring card company merchants;
Credit card application for the card company;
Applications to register with shipping companies; and
A browser(s) which is configured to dial direct any of the selected merchants via a toll free offline number. The cardholder can make buying selections off line and utilizing all of the benefits of CardFort to burst their selection to the merchant's CardFort data base.

Off-Line Catalog/Website

Purchases may be made by the cardholders using off-line catalog/websites which may be provided as part of the CardFort software. The catalog/websites may be provided in electronic form and can be functional copies of merchant websites. The catalogs serve as a stand alone method for the card company and/or merchants to open another sales channel. Some of the benefits of the off-line catalog or website are:

The off-line Website acts as a digital catalog;

Off-line CardFort shopping stops "wandering" shoppers by allowing them to view only selected merchants;

Staff personal required to answer telephone calls from conventional shoppers is reduced or eliminated, thus eliminating expense and shortening phone time;

Merchants save money by producing a catalog once as a website;

Production costs compared to paper catalogs is minimized;

Shipping and mailing costs for catalogs are minimized;

Updates are as fast as updates to the website;

Users with no Internet connection or who choose not to use the Internet can still buy products from the catalog; and The off-line catalogs open another sales channel for merchants.

Embodiments of the CardFort System

Figure 2:
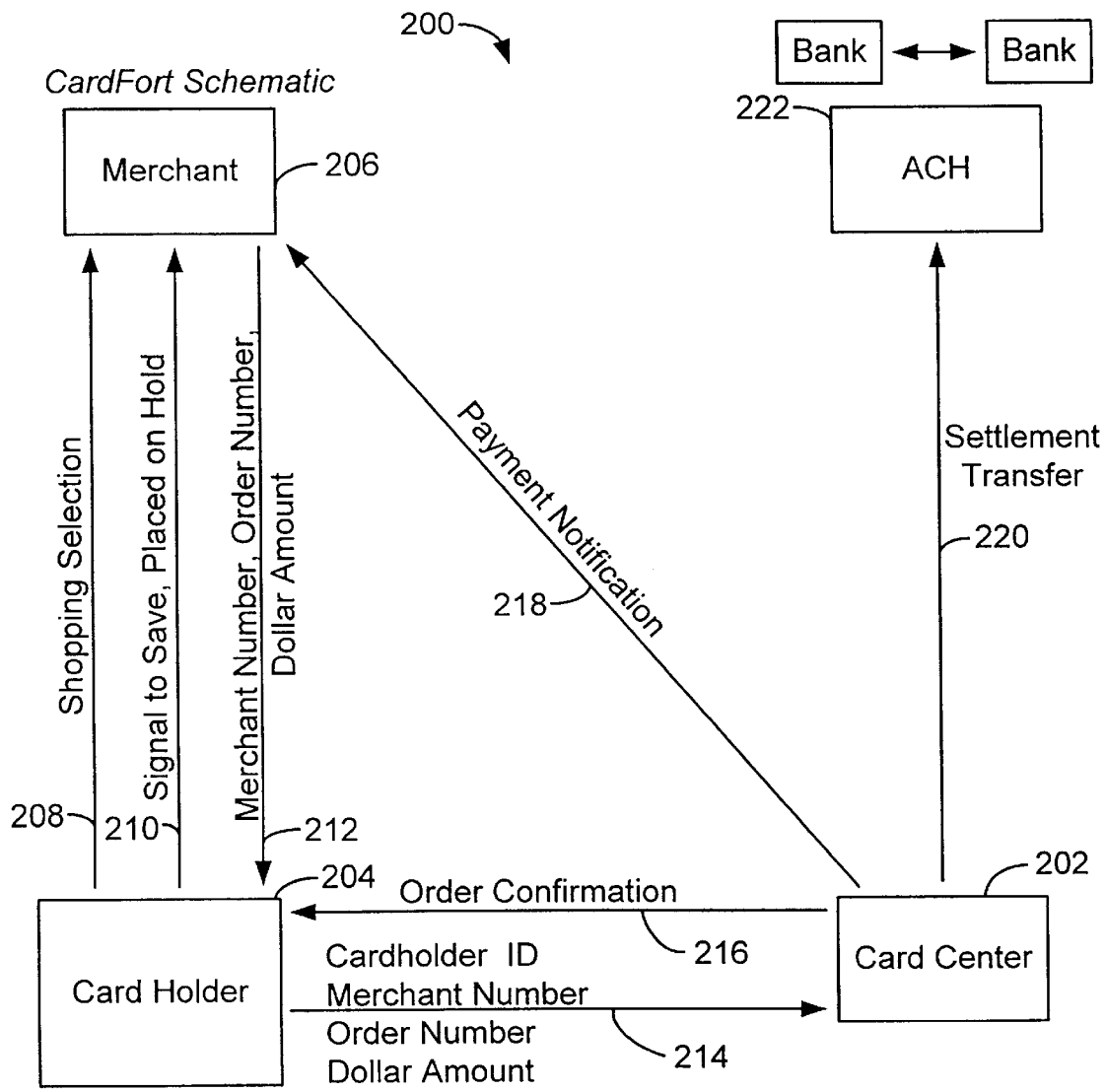
FIG. 2 shows a diagram of a financial transaction system in accordance with the present invention.

FIG. 2 shows a financial transaction system 200 (CardFort) constructed in accordance with the present invention. As part of the CardFort system, a credit card company 202 (or other credit provider) issues software to a cardholder 204 that is used on the cardholder's computer to implement features of the CardFort system, thus allowing the cardholder to conduct financial transactions over the Internet. The card company 202 also authorizes a subscribed merchant 206 to utilize the CardFort system and issues software to the merchant for use in conjunction with the merchant's website. The merchant agrees to accept payment from the card company via an ACH 222, which may perform bank to bank transfers. Once the software is installed on both the cardholder's and merchant's computers, a financial transaction in accordance with the present invention may be conducted.

Figure 3:
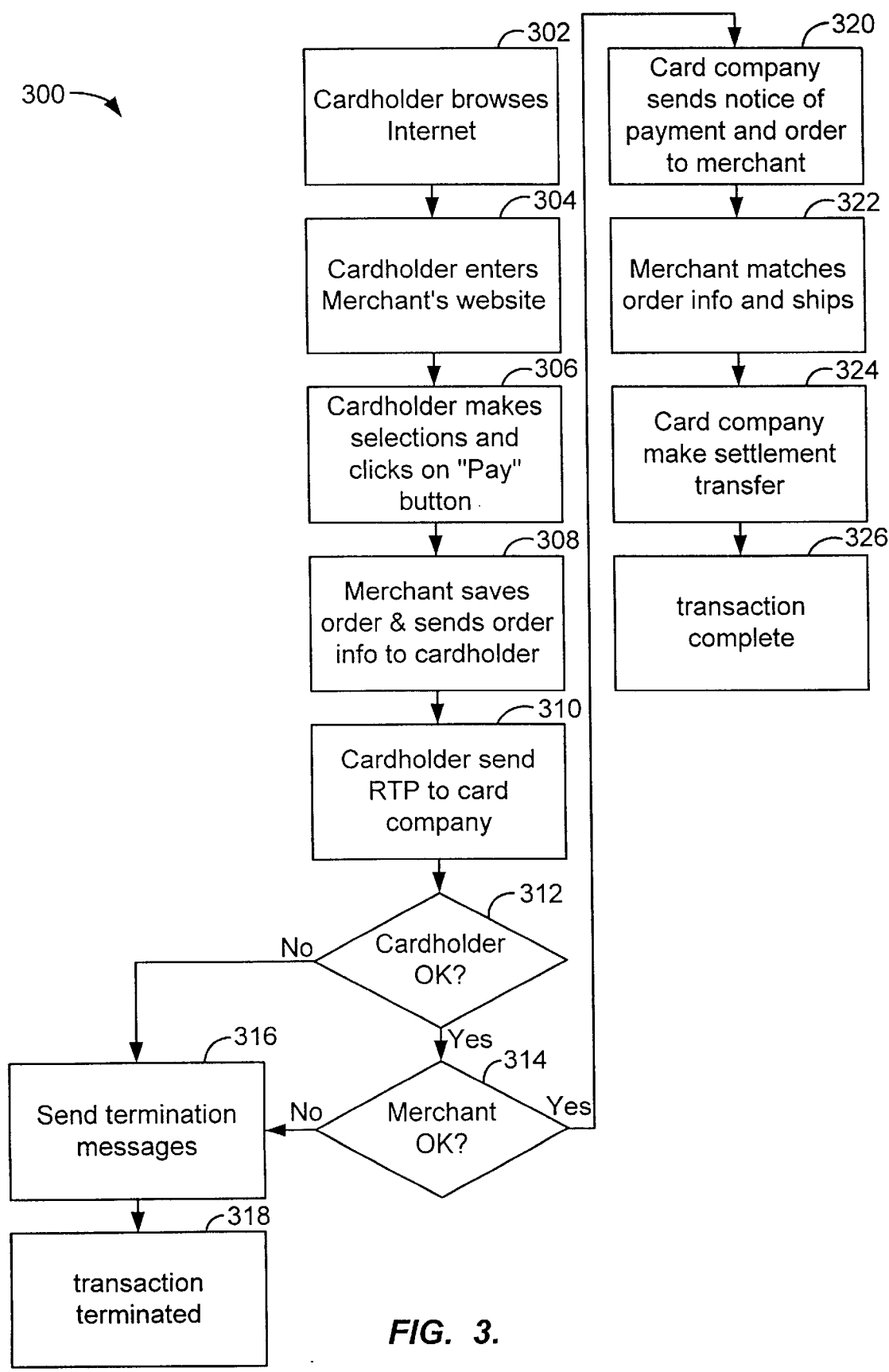
FIG. 3 shows a method of operating the financial transaction of FIG. 2.

FIG. 3 shows a method 300 of conducting a financial transaction using the financial transaction system of FIG. 2. Using the method 300, secure financial transactions may occur between the cardholder 204, merchant 206, and card company 202.

At block 302, the cardholder browses the Internet using a browser program, however, specific details of the browser program are not relevant to the present invention. In one embodiment, the CardFort software operates as a plug-in in the cardholder's browser program.

At block 304, the cardholder enters the merchant's website, which is also running the CardFort software. The merchant's website recognizes the CardFort plugin included in the cardholder's browser software, and thus knows that the cardholder is a member of the CardFort system. For example, in one embodiment, the plugin installed on the cardholder's computer may send special codes upon entering the merchant's website. These codes are interpreted by the CardFort software installed on the merchant's system to determine that the cardholder is registered with the CardFort system. In another embodiment, the merchant's system transmits special codes to the cardholder's computer, which can be interpreted at the cardholder's computer. A response is generated from the cardholder's computer to the merchant's system, which results in both computer system's acknowledging membership in the CardFort system.

At block 306, the cardholder selects one or more products or services for purchase from the merchant's website. This is shown at path 208 in FIG. 2. For example, the website may have a virtual shopping cart that the cardholder places selections into. At some point, the cardholder desires to purchase the items in the shopping cart, and clicks on a "button" which may read, "pay by CardFort." This is shown at path 210.

At block 308, after the cardholder clicks the "pay by CardFort" button, which is signaled to the merchant's computer, the merchant's computer saves the cardholder's order in a merchant data base. The merchant's computer then creates a purchase order containing the merchant's CardFort ID, a unique order number for the purchase, a dollar amount for the purchase, and any other desired data such as the merchant's email address, URL, etc. The purchase order is transmitted to the cardholder's computer, as shown at path 212, and stored in a CardFort database on the cardholder's computer. In essence, the purchase order acts as the merchant's offer to sell the selected items to the cardholder.

At block 310, the cardholder's browser "tickles" the merchant site to keep the Internet connection active. In the meantime, the cardholder's browser transmits a request to pay (RTP) to the card company's system as shown at path 214. The RTP includes the purchase order data from the merchant and the cardholder's unique CardFort ID and password.

At blocks 312 and 314, the request to pay (RTP) and the purchase order enters the card company's CardFort system. The card company's CardFort software performs two tests. The first test, at block 312, determines whether the cardholder is allowed to make the requested purchase. For example, it is determined whether the cardholder has enough credit available to pay for the selected items. The second test, at block 314, determines whether the merchant is allowed to participate in this transaction. For example, is the merchant a registered CardFort merchant in good standing.

At block 316, if either test fails, the system replies to the predetermined OVRT addresses with an appropriate message for both the merchant and the cardholder. For example, one message may go to the cardholder that says that there is not enough credit available to make the requested purchase. A second message may go to the merchant that says that the cardholder is unable to complete the transaction. The merchant may also receive a message indicating that the transaction was terminated since the merchant is not a CardFort member. The merchant's OVRT may be provided during merchant registration or included in the purchase order information sent to the card company. Once the messages are sent, the transaction is terminated as shown at block 318.

At block 320, if both tests at blocks 312 and 314 pass, the card company system replies to the predetermined OVRT addresses with an appropriate message to both the cardholder and the merchant. The message to the cardholder, shown at path 216 may be an order confirmation number or other indication that the order is to be placed. The message to the merchant includes a unique order number and a pre-registered shipping address or an authorized alternate shipping address, as shown at path 218. The card company also notifies the merchant that payment has been made to the ACH used to transfer funds between the card company and the merchant.

At block 322, the merchant matches the order information contained in the received OVRT with the order information contain in the merchant database. If the information matches, the merchant ships the order to the address specified.

At block 324, the card company's system collects payment from cardholder and forwards payment to the merchant via a settlement transfer to the ACH 222, as shown at path 220. Once the settlement transfer is made, the transaction is complete as shown at block 326.

As a result of performing a financial transaction in accordance with the method 300, the cardholder's credit card number or other personal information is never transmitted over the computer network. This prevents anyone from stealing the information. An additional level of security is provided since the merchant never has access to the credit card number or other personal information. Therefore, corruption or lack of security at the merchant's site will have no effect on the security of the cardholder's personal information.

The transfer of funds from the card company to the merchant may occur in several ways. In the above embodiment, the transfer occurred using an ACH. Since the transfer of funds is secondary to the present invention, it is possible to transfer funds in other ways without deviating from the scope of the present invention. For example, by wiring funds directly to a merchant's account.

Invoice Paying System

In another embodiment of the present invention, an invoice paying system is provided, wherein a cardholder can make payments to merchants and/or service providers and/or other CardFort cardholders registered with the CardFort system.

Figure 4:
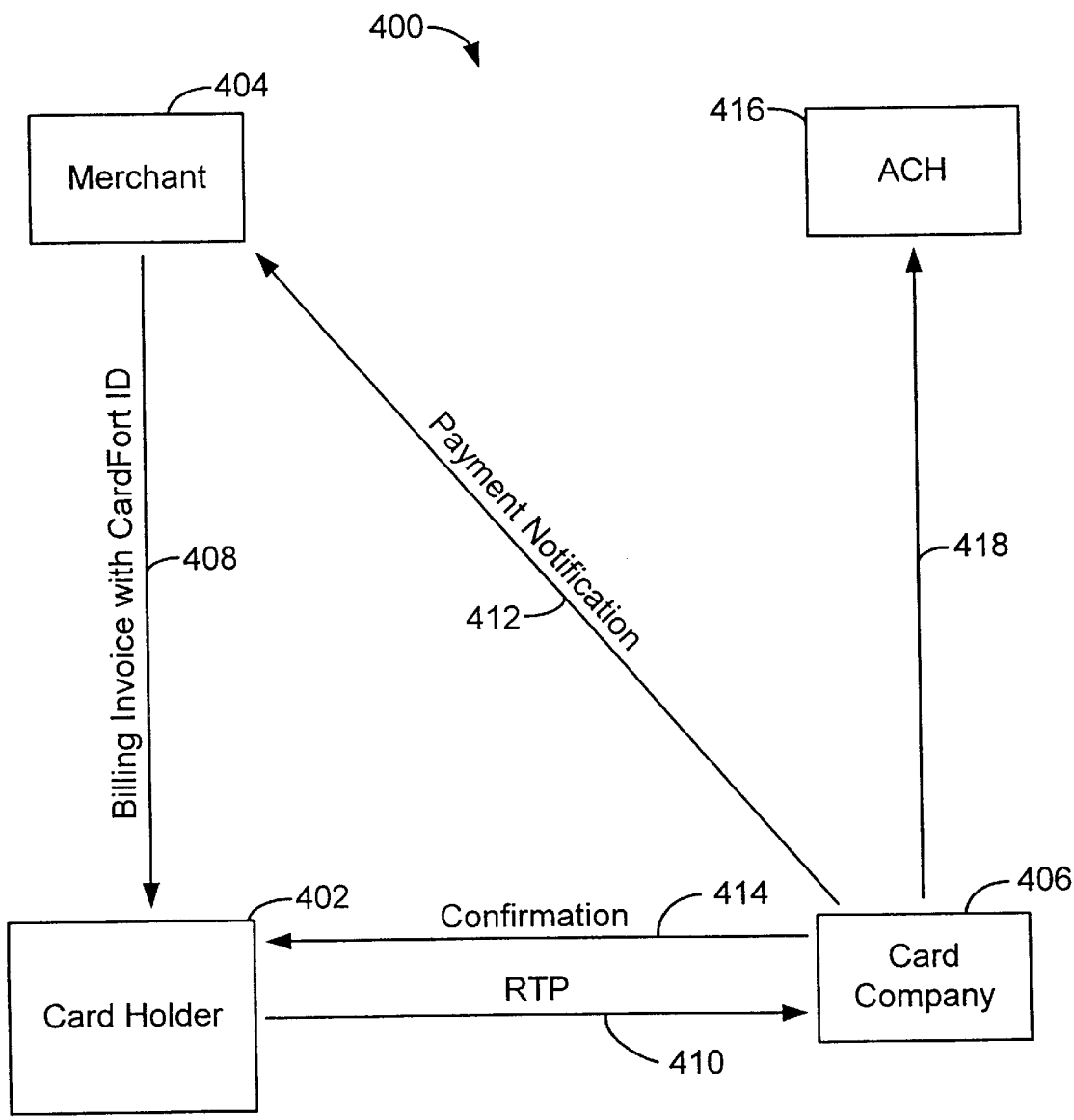
FIG. 4 shows a diagram of a financial transaction system for paying merchant invoices in accordance with the present invention.

FIG. 4 shows an invoice paying system 400 (or bill paying system) for paying invoices for goods or services in accordance with the present invention. The system 400 operates to allow a cardholder 402 to pay an invoice from a merchant 404 via a card company 406.

Figure 5:
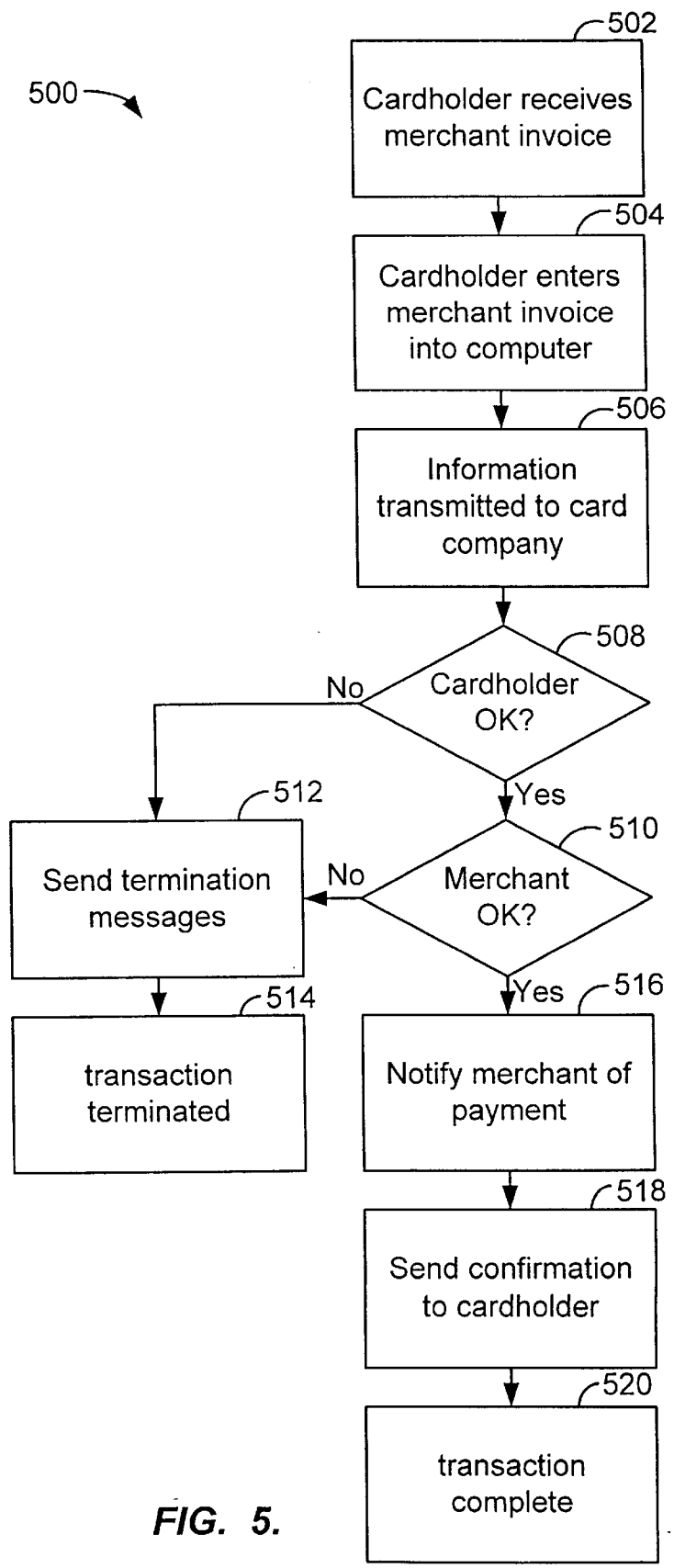
FIG. 5 shows a method of operating the financial transaction system of FIG. 4.

FIG. 5 shows a method 500 for conducting a financial transaction for use with the invoice paying system of FIG. 4. It will be assumed that the merchant and cardholder are registered with the CardFort system.

At block 502, the cardholder receives an invoice for goods and/or services from the merchant. The invoice may be received via electronic means, such as email, or as a delivered hardcopy. The invoice contains the merchant's CardFort ID number along with other relevant billing information. This is shown at path 408.

At block 504, the cardholder enters the merchant's CardFort ID information and the billing information into his or her own computer system, which has the CardFort software installed.

At block 506, the cardholder transmits all the information to the card company along with an RTP as shown at path 410.

At block 508, the card company verifies that the cardholder has the available credit to pay the merchant invoice.

At block 510, the card company verifies that the merchant is registered with the CardFort system and is eligible to receive payments made through the system.

At block 512, if the checks performed at blocks 508 and 510 of the cardholder or the merchant fail, then a message is sent to the cardholder indicating that the invoice cannot be paid by the CardFort system. The transaction is then terminated as shown at block 514. A message need not be sent to the merchant, since the merchant may not even be aware that the cardholder is attempting to pay the invoice via the CardFort system.

At block 516, if the checks at blocks 508 and 510 pass, the card company notifies the merchant that payment has been made on behalf of the cardholder for the invoice amount. This is shown at path 412. The card company transfers funds to the ACH 416 agreed to by the merchant and the card company, as shown at 418.

At block 518, the card company sends a confirmation to the cardholder indicating that the merchant has been paid, as shown at path 414.

At block 520, the transaction is completed and the cardholder can record in a payment log that the invoice has been paid. The merchant sends the purchased items to the cardholder which may include an account statement for the cardholder's records.

In business situations, the invoice paying system allows the consumer to make repeat orders or orders as needed, rather than having to cancel a standing automatic recurring system order. Professional services that don't have a web site, but wish to take credit card payments, can do so using the invoice paying system included in the present invention. For example, if the cardholder obtains the service provider's CardFort ID number and invoice information from a bill mailed to the cardholder. The cardholder can still arrange for payments to be made via the CardFort system with notification sent to the merchant via standard telephone, mail or fax systems.

Off-Line Catalog/Website Purchases

In one embodiment of the present invention a financial transaction system is provided for purchasing goods and service from catalogs published by merchants. The catalogs may be in the form of hardcopy or in the form of electronically downloaded merchant catalogs or web pages. Thus, a purchaser can view the catalog information in an off-line mode, i.e. when not connected to a merchant's website, and purchase selected goods or services. When downloaded as web pages, the catalogs may be fully functional and operate in the same manner as if the cardholder was connected on-line to the merchant's website.

Figure 6:
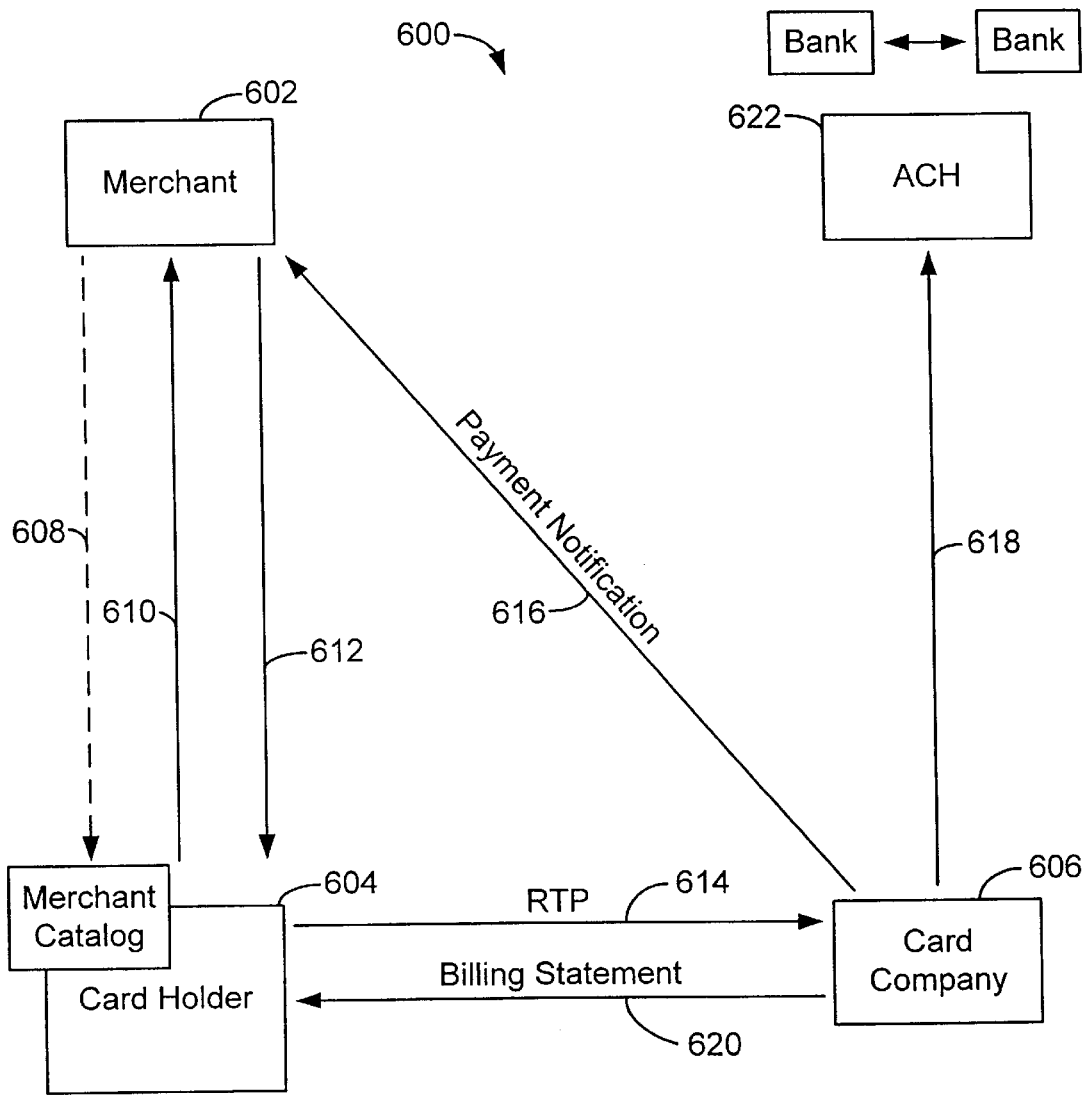
FIG. 6 shows a diagram of a financial transaction system for making off-line purchases in accordance with the present invention.

FIG. 6 shows a financial transaction system 600 for purchasing goods and services off-line. A merchant 602 provides catalog information 601 about available goods or services to a cardholder 604 (or purchaser). The cardholder 604 make purchases from the catalog 601 using the CardFort system provided by a card company 606. An ACH 622 may be used to make bank to bank transfers allowing the card company to transfer funds to the merchant on behalf of the cardholder.

Figure 7:
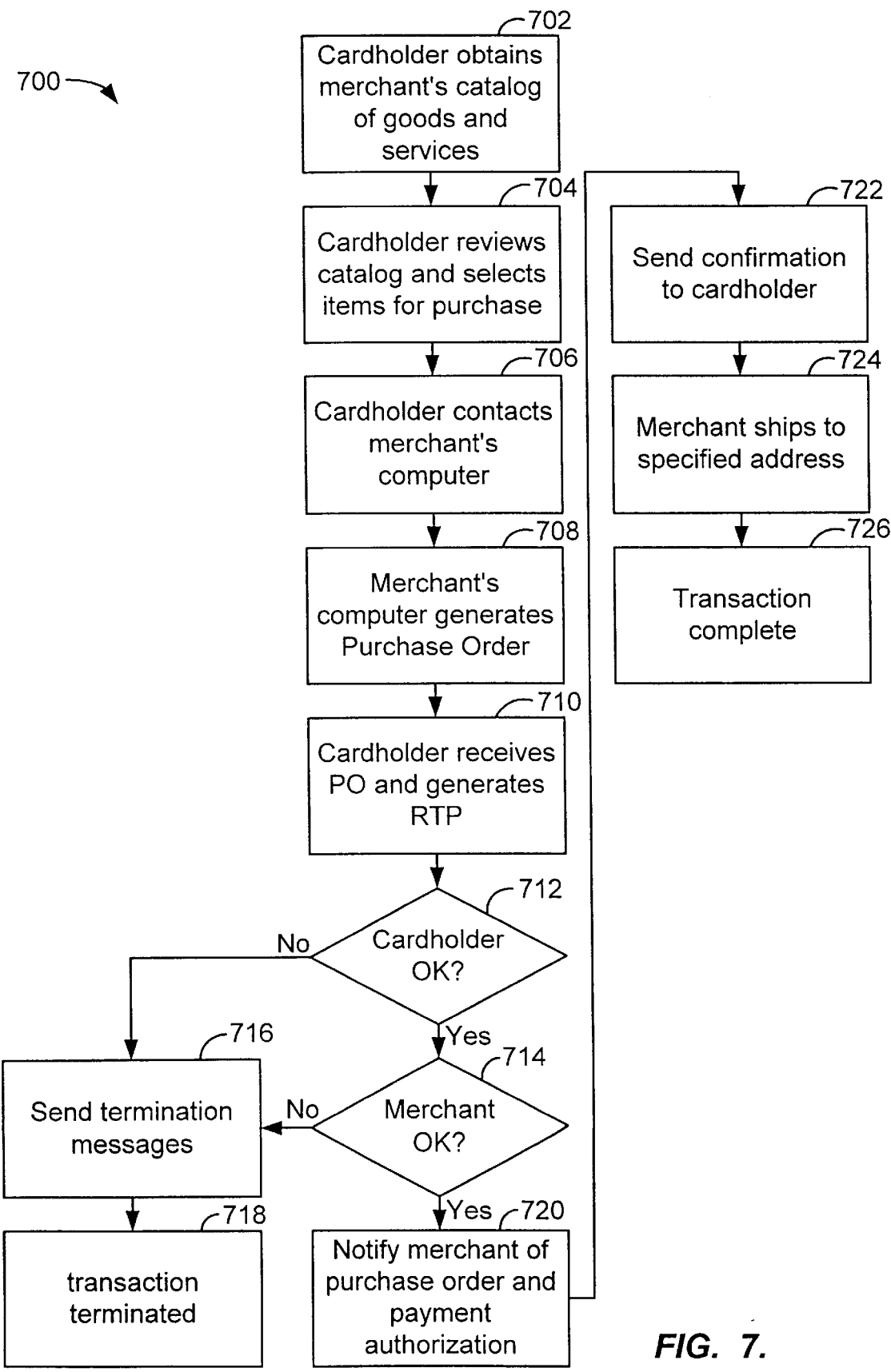
FIG. 7 shows a method of operating the financial transaction system of FIG. 6.

FIG. 7 shows a method 700 for conducting a financial transaction using the financial transaction system of FIG. 6.

At block 702, the cardholder 604 receives a catalog 601 from the merchant 602, as shown at path 608. The cardholder may obtain the catalog in several ways. For example, the merchant may send a hardcopy catalog to the cardholder via regular mail or other mail delivery or facsimile service. The merchant may also transmit a softcopy of the catalog to the cardholder's computer via email or other electronic transmission means. It is even possible for the cardholder to connect to the merchant's website and selectably download the catalog from the merchant's website to the cardholder's computer for later viewing. The catalog may also be an off-line functional version of the merchant's website.

The catalog includes information identifying goods and/or services offered by the merchant. The information also includes prices associated with each good or service and related shipping services available and costs. The catalog may also include the merchant's CardFort ID and any other CardFort merchant profile information.

At block 704, the cardholder reviews the merchants catalog off-line. For example, the cardholder may read the hardcopy of the catalog when away from his or her computer, or may view the electronic version of the catalog on his or her computer when not connected to the merchant's on-line system. Assuming an electronic off-line catalog is being viewed, the cardholder may select items for purchase and click on a "buy" button to begin the purchase process. Assuming a hardcopy catalog is being viewed, the cardholder may select items for purchase and enter corresponding item identification information, the merchant's CardFort ID, a phone number to contact the merchant, and any other related information into the cardholder's CardFort software.

At block 706, after the selections are made and the "buy" button is clicked on, the cardholder's computer activates a dialing string which dials a phone number designated by the merchant to take digital orders. This is shown at path 610. The merchant's CardFort or other software answers the call to receive the purchase data from the cardholder's computer, which may be in the form of delimited text and stores it in the merchant's database. Optionally, the merchant's computer system will check for inventory levels and/or price changes. If items are out of stock or there has been a price change, the merchant's software will reply to the cardholder's computer to give the cardholder the option to revise the order or to proceed. The merchant will have the option to terminate the call and prompt the cardholder to resubmit the order when the changes have been made or to keep the connection while the cardholder revises the order.

In another embodiment, when the "buy" button is clicked on, the cardholder's computer is directed to the merchant's website on the data network. After the data network connection is established, information exchanged between the merchant and the cardholder is done via the data network.

At block 708, the merchant's computer then creates a purchase order containing the merchant's CardFort ID, a unique order number for the purchase, a dollar amount for the purchase, and any other desired data such as the merchant's email address, URL, etc. The purchase order is transmitted to the cardholder's computer, as shown at path 612, and stored in a CardFort database on the cardholder's computer.

At block 710, the cardholder's computer transmits a request to pay (RTP) to the card company's system as shown at path 614. The RTP may be transmitted over a direct telephone connection to the card company's system. The RTP includes the purchase order data from the merchant and the cardholder's unique CardFort ID and password. Alternatively, the request to pay may also include other information, such as cardholder survey information, wherein the cardholder recommends other merchants that should be part of the CardFort system.

At block 712, the card company's system checks to see if the received RTP is from a registered CardFort member. The card company's system also reviews the information regarding the requested purchase and determines if the cardholder has sufficient funds or credit to cover the cost of the requested items.

At block 714, the card company's system checks to see if the merchant ID belongs to a registered CardFort merchant. The card company's system may perform other checks on the merchant, such as checking customer service ratings, etc.

At block 716, if either the cardholder or the merchant fail the checks performed in blocks 712 and 714, then a termination message is sent from the card company to the cardholder. The termination message indicates to the cardholder why the requested purchase was rejected. At block 718, after the termination message is sent, the attempted transaction is terminated.

At block 720, if both checks in blocks 712 and 714 pass, then the card company's system creates a purchase order to transmit to the merchant as shown at 616. The purchase order contains information about the items to be purchased, shipping information and payment notification. At the same time, the card company transfers payment to the merchant via the ACH 620, as shown at path 618.

At block 722, an order confirmation sent from the card company informs the cardholder that the order has been placed, as shown at path 620.

At block 724, the merchant ships the requested items to the cardholder at the address specified in the purchase order. At block 726, the cardholder receives the items requested and the transaction is completed.

Purchases via Card Company Portal

In one embodiment of the present invention a financial transaction system is provided for purchasing goods and services over a data network using a portal provided by a financial institution. The portal is a location on the data network that can be accessed by the cardholder. For example, a cardholder may have a credit account with a financial institution. The cardholder logs onto a portal operated by the financial institution. The portal provides the cardholder the capability to browse the product offerings of selected merchants associated with the financial institution and to purchase items from them. When purchases are made, the merchant and the financial institution negotiate the payment and the items are ship directly to the cardholder. Thus, a secure transaction can occur with minimal cardholder involvement and without transmitting the cardholder's card number over the data network.

Figure 8:
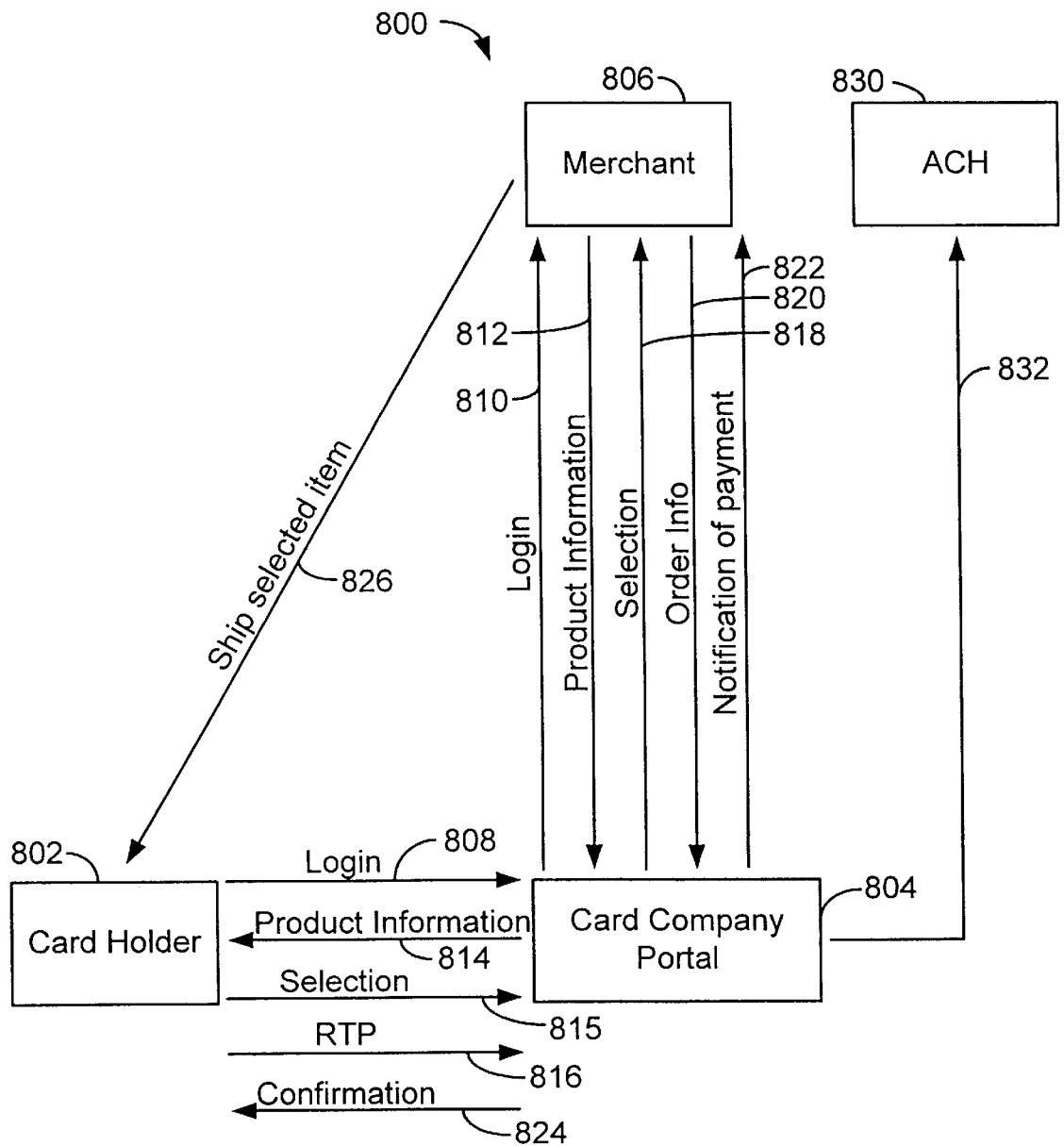
FIG. 8 shows a diagram of a financial transaction system that uses a card company's portal website in accordance with the present invention.

FIG. 8 shows a financial transaction system 800 for purchasing goods and services via a financial institution portal in accordance with the present invention. A cardholder 802 logs into the portal of a financial institution 804 which provides links to one or more merchants. A merchant 806 provides information about available goods or services offered to a cardholder 802 via the portal. When the cardholder desires to make purchases from the merchant, the financial institution and the merchant complete a financial transaction to purchase the items. The merchant then ships the goods to the cardholder. Since the merchant's are linked to the cardholder through the portal, the financial institution knows all the merchant IDs and can thus assure that all the linked merchants are registered with the CardFort system and are in good standing. If not, a merchant may be removed from the financial institution's portal.

Figure 9:
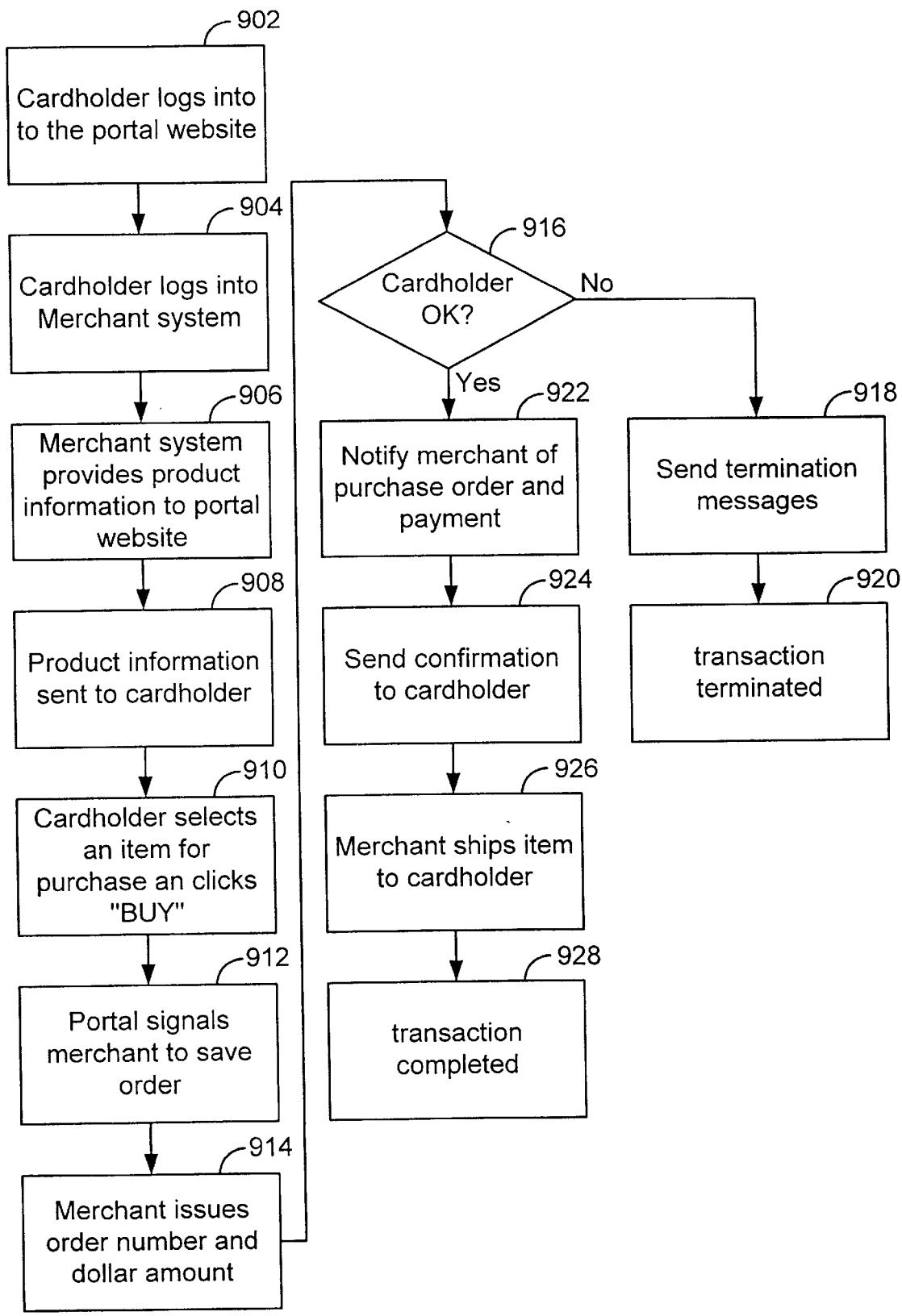
FIG. 9 shows a method of operating the financial transaction system of FIG. 8.

FIG. 9 shows a method 900 for conducting a financial transaction using the financial transaction system of FIG. 8.

At block 902, the cardholder logs into the portal provided by the financial institution. This is shown at path 808. At block 904, the cardholder selects one of the merchants associated (linked) with the portal and logs into the selected merchant website, as shown at path 810.

At block 906, the merchant transmits product information to the portal as shown at path 812. At block 908, the product information from the merchant is forwarded to the cardholder as shown at path 814.

At block 910, the cardholder selects an item for purchase from the merchant's product information. The cardholder sends a Selection as shown at 815 and an RTP to the portal as shown at path 816. At block 912, the portal forwards the Selection to the merchant which triggers the order to be saved as shown at path 818. At block 914, the merchant receives the "Buy" signal and transmits the order information, such as order number and amount, to the protal website as shown at path 820.

At block 916, the financial institution receives the order information and determines if the cardholder has enough credit available to cover the cost of the purchase. The financial institution may make other checks at this time, for example, whether the cardholder is eligible to purchase products from this particular vendor.

At block 918, if the cardholder does not have the credit or resources available to pay for the selected item, then a termination message is sent to the cardholder, and at block 920, the transaction is terminated.

At block 922, if the financial institution determines that the cardholder has credit available to purchase the selected item, then a notification is sent to the merchant informing the merchant that payment has been made and that the item should be shipped to the cardholder at a specified cardholder address, as shown at path 822. A transfer of funds to the merchant is made by the card company via an ACH 830, as shown at path 832.

At block 924, a confirmation of the purchase is sent to the cardholder as shown at path 824, indicating that the purchase has been completed. At block 926, the merchant ships the selected item to the cardholder as shown at path 826. At block 928, the transaction is completed.

Exemplary Apparatus

Figure 10:
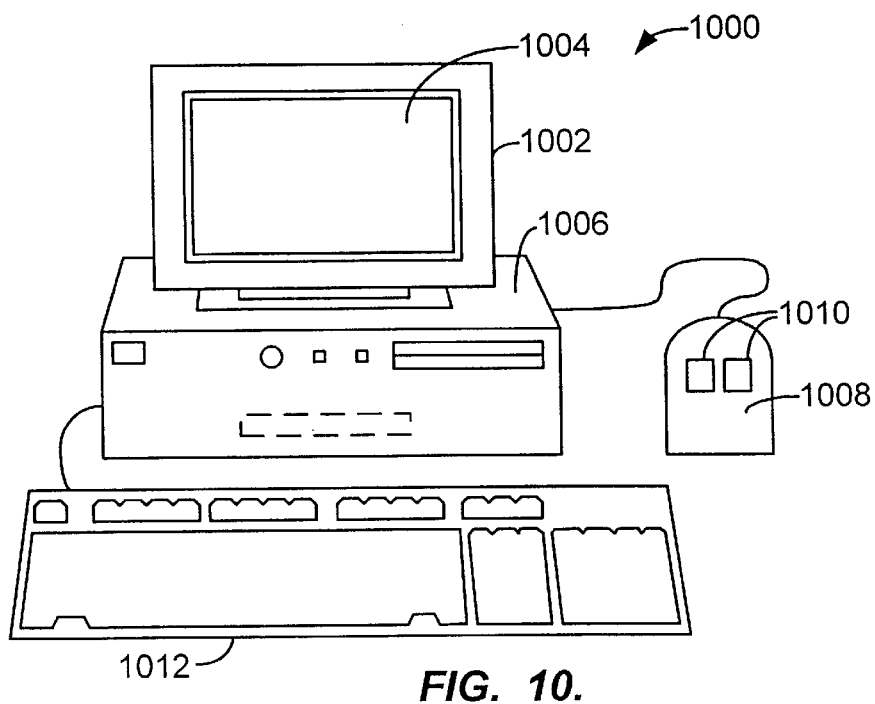
FIG. 10 shows a computer device suitable for use with embodiments of the present invention.

FIG. 10 shows a computer device 1000 suitable for use in embodiments of the financial transaction system in accordance with the present invention. Computer device 1000 includes display 1002 having display screen 1004. Cabinet 1006 houses standard computer components (not shown) such as a disk drive, CDROM drive, display adapter, network card, random access memory (RAM), central processing unit (CPU), and other components, subsystems and devices. User input devices such as a mouse 1008 having buttons 1010, and a keyboard 1012 are shown. Other user input devices such as a trackball, touch-screen, digitizing tablet, etc. can be used. In general, the computer device 1000 is illustrative of one type of computer system, such as a desktop computer, suitable for use with the present invention. Computers can be configured with many different hardware components and can be made in many dimensions and styles (e.g., laptop, palmtop, server, workstation, mainframe). Thus, any hardware platform suitable for performing the processing described herein is suitable for use with the present invention.

Figure 11:
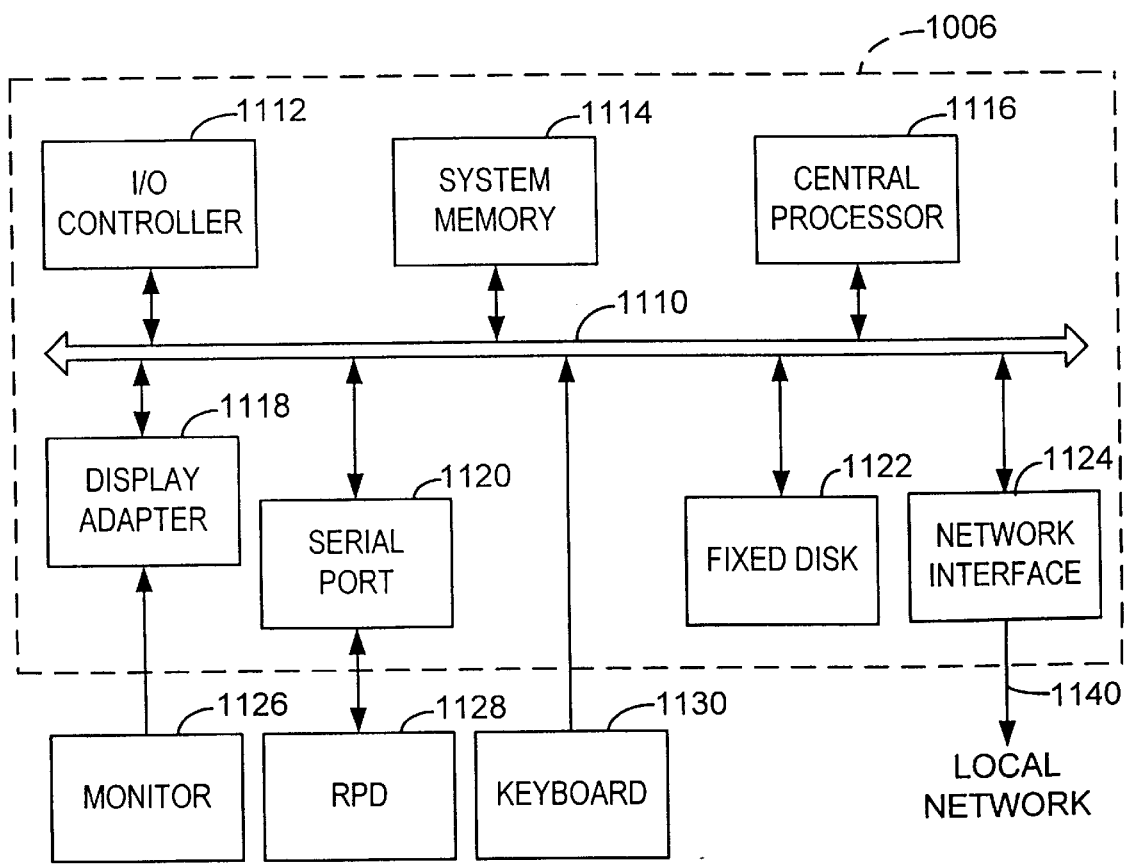
FIG. 11 shows components within the computer device of FIG. 10.

FIG. 11 illustrates subsystems that might typically be found in a computer device such as computer device 1000. Subsystems within box 1006 are directly interfaced to an internal bus 1110. Such subsystems typically are contained within the computer system, such as within the cabinet 1006 of FIG. 10. Subsystems include input/output (I/O) controller 1112, System Random Access Memory (RAM) 1114, Central Processing Unit (CPU) 1116, Display Adapter 1118, Serial Port 1120, Fixed Disk 1122 and Network Interface Adapter 1124. The use of the bus 1110 allows each of the subsystems to transfer data among the subsystems and, most importantly, with the CPU 1116. External devices can communicate with the CPU or other subsystems via the bus 1110 by interfacing with a subsystem on the bus. Monitor 1126 connects to the bus through Display Adapter 1118. A relative pointing device (RPD) 1128 such as a mouse connects through Serial Port 1120. Some devices such as keyboard 1130 can communicate with the CPU 1116 by direct means without using the main data bus as, for example, via an interrupt controller and associated registers (not shown).

As with the external physical configuration shown in FIG. 10, many subsystem configurations are possible. FIG. 11 is illustrative of one suitable configuration. Subsystems, components or devices other than those shown in FIG. 11 can be added. A suitable computer system can be achieved without using all of the subsystems shown in FIG. 11. Other subsystems such as a CDROM drive, graphics accelerator, etc. can be included in the configuration without affecting the performance of the system of the present invention.

Exemplary Data Formats in the CardFort System

FIGS. 12A–12D show exemplary data formats which may be used during transactions described in the above embodiments.

FIG. 12A shows an exemplary data format 1200 for information transmitted from a merchant to a cardholder during operation of embodiments of the present invention. The data format 1200 includes a merchant ID 1202, an order number 1204, a purchase amount 1206, a transaction data 1208 and a merchant OVTR 1210. Other information relative to the financial transaction may be included, however, the data format 1200 is intended to be an exemplary list and not an exhaustive list of all the possible data that may be transmitted from the merchant to the cardholder during operation of the financial transaction system included in the present invention.

FIG. 12B shows an exemplary data format 1220 for information transmitted from a cardholder to a card company during operation of embodiments of the present invention. The data format 1220 may includes all or a portion of the data included in the data format 1220. The data format 1220 also includes a CardFort cardholder ID 1222 and a cardholder OVTR 1224. Other information relative to the financial transaction may be included, however, the data format 1220 is intended to be an exemplary list and not an exhaustive list of all the possible data that may be transmitted from the cardholder to the card company during operation of the financial transaction system included in the present invention.

FIG. 12C shows an exemplary data format 1230 for information transmitted from a card company to a merchant during operation of embodiments of the present invention. The data format 1230 may include the order number 1204, the purchase amount 1206 and the transaction date 1208. Additional information such as a shipping name 1232, a shipping address 1234, a shipping state 1236, a shipping state 1238 and a shipping zip code 1240 may also be included. Other information relative to the financial transaction may be included, however, the data format 1230 is intended to be an exemplary list and not an exhaustive list of all the possible data that may be transmitted from the card company to the merchant during operation of the financial transaction system included in the present invention.

FIG. 12D shows an exemplary data format 1250 for information transmitted from a card company to a merchant during operation of embodiments of the present invention. The data format 1250 may include the order number 1204, the purchase amount 1206 and the transaction date 1208. Information 1243, which relative to the cardholder's shipping information, can be omitted so that such information given to the merchant only identifies the purchase that has been paid for. The data format 1250 may also include a shipper identifier 1241, so that the merchant is notified of a third party shipper that will handle shipping the purchase to the cardholder. The cardholder's shipping information may be given to the third party shipper and may be keep confidential from the merchant. Other information relative to the financial transaction may be included, however, the data format 1250 is intended to be an exemplary list and not an exhaustive list of all the possible data that may be transmitted from the card company to the merchant during operation of the financial transaction system included in the present invention.

FIG. 13 shows an exemplary CardFort purchase log 1300 that may be included with the CardFort system and located at the cardholder's computer system. The purchase log includes a transaction date 1302, a merchant (company name) 1304 and a purchase amount 1306. The purchase log 1300 may also include a merchant URL 1308 or merchant email address 1310, which can be part of the merchant's OVRT. A transaction number 1312 may also be included in the purchase log. The transaction number 1312 being relative to a card company transaction system, so that the cardholder may reference a particular transaction by the card company transaction number.

Other information relative to financial transactions may be included in the purchase log, however, the purchase log 1300 is intended to be an exemplary list and not an exhaustive list of all the possible data that may be included. A similar purchase log may be found at the merchant or card company site. Thus, all parties to a particular transaction may maintain log information, and thereby store a history of financial transaction information.

FIG. 14 shows an exemplary electronic shopping cart 1400 wherein a cardholder may enter goods for purchase from a merchant. The electronic shopping cart 1400 can be used in both on-line and off-line operating modes. For example, when a cardholder is connected to a merchant's web site, the merchant information, as shown at 1402, is automatically inserted. If an off-line catalog electronic catalog from the merchant is used, the merchant information 1402 may also be automatically inserted. However, if a hardcopy of a merchant catalog is being used, the cardholder manually enters the merchant information 1402 into the electronic shopping cart.

As each selection is entered, item information, shown at 1404, is entered into the electronic shopping cart. A total is provided at 1406. When the cardholder has completed making item selections, a buy button 1408, may be clicked on to start the financial transaction as provided for in embodiments of the present invention. Therefore, the electronic shopping cart can be used in both on-line and off-line applications to select item for purchase from a merchant and to activate a financial transaction in accordance with the present invention.

Figure 15:
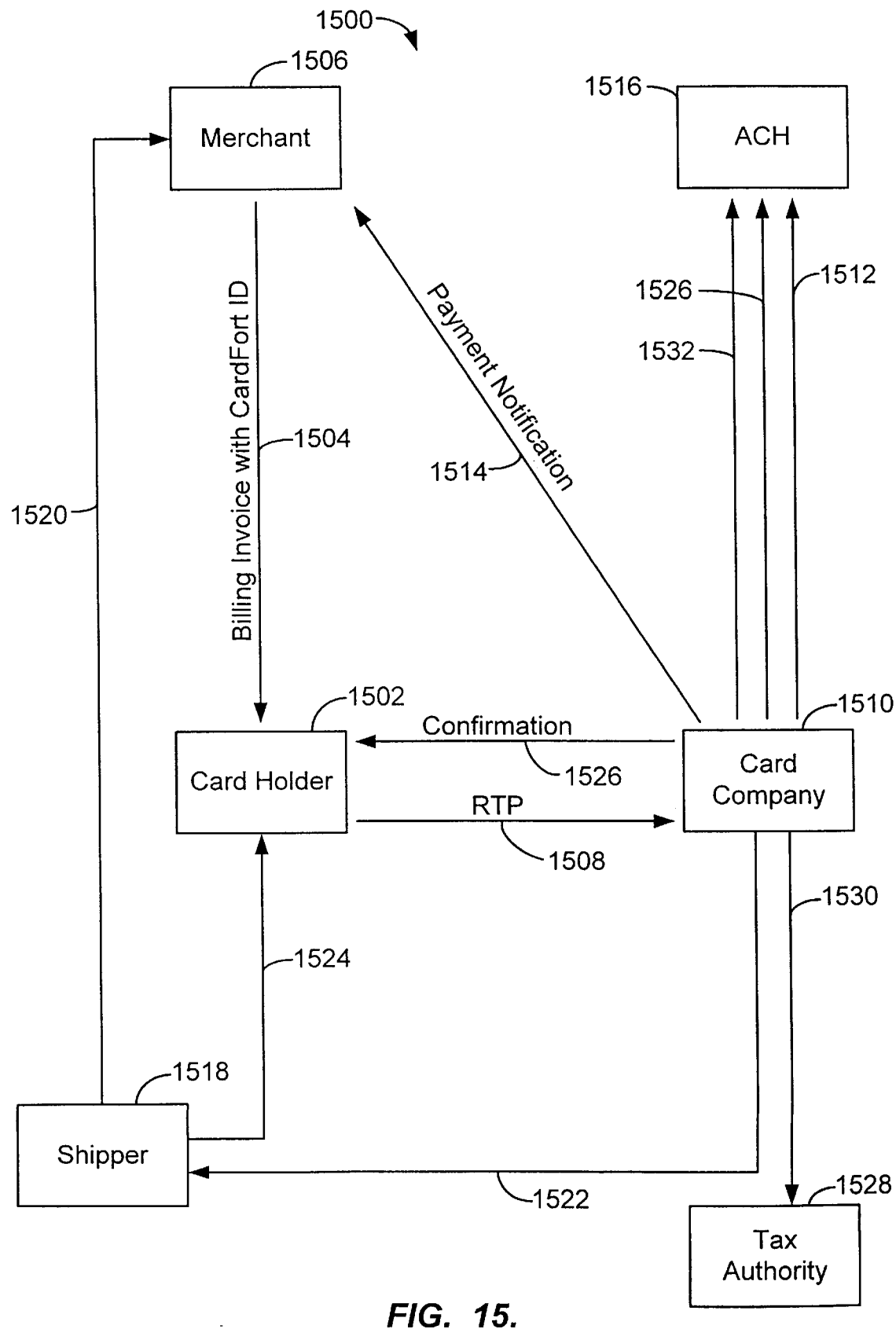
FIG. 15 shows a financial transaction system for making a purchase that includes a third party shipper.

FIG. 15 shows a financial transaction system 1500 for making a purchase using a third party shipper. In the system 1500, the cardholder 1502 receives purchase information 1504 from a merchant 1506. The cardholder 1502 sends a RTP 1508 to card company 1510, which sends payment 1512 via ACH 1516, and payment notification 1514 to the merchant 1506. The transaction to this point is similar to transactions described in other embodiments above.

Also included in the system 1500 is a third party shipper 1518. The third party shipper 1518 provides an additional level of security, by protecting the identity and address of the cardholder 1502 from the merchant 1506. During operation of the system 1500, the card company does not included cardholder shipping information in the payment notification 1514. Instead, the card company sends the shipping information along with information identifying the purchase and the merchant (as shown at 1522) to the shipper 1518. In the payment notification 1514, the card company informs the merchant 1506 that the shipper 1518 will be used to ship purchased items. As a result, the merchant 1506 is provided notification that payment for a particular purchase has been made, but is not notified where the purchase is to be shipped or who the receiver will be. Thus, a further level of security for the cardholder information is established.

The shipper 1518 and the merchant 1506 exchange information 1520 wherein the shipper identifies the cardholder's purchase and the merchant provides the items to be shipped. However, the merchant does not know the cardholder's address and the shipper does not provide this information to the merchant. The shipper receives the items from the merchant and ships them to the cardholder address (as shown at 1524) provided in the shipping information from the card company. As a result, the cardholder's shipping address is protected from the merchant in addition to the cardholders credit card number. After the card company sends the payment notification, a confirmation 1526 is sent to the cardholder 1502.

In another embodiment of the present invention, financial transactions can be made between two or more CardFort cardholders. For example, transactions involving personal items such as used automobiles, furniture or jewelry may be transacted using the CardFort system. In such a transaction, a first registered CardFort cardholder (seller) provides his or her CardFort identifier to a second registered CardFort cardholder (buyer). The buyer cardholder then sends a RTP to the card company, which in turns, credits the seller's account and sends a payment notification to the seller. A confirmation is then sent to the buyer. The Seller then provides the automobile to the buyer. In this transaction the CardFort system protects the buyer's account number from the seller and thus functions to provide a secure transaction mechanism that can facilitate credit based transactions or replace the use of personal checks or cash.

Additional Benefits of the CardFort System

"E Wallets" Eliminated

E wallets are software systems which store the cardholder's card number to avoid the repeated effort of filling out the customer data for each purchase. Some E wallets reside on the cardholder's computer while some are held on a remote server. These devices actually increase the vulnerability of the card number by holding both the card number and the owner's details in the same repository (wherever that may be) and in the case of server based E wallets, the number travels to and is known by a third party. The various embodiments of the present invention eliminate the use of E wallets, since the cardholder's card number is no longer transmitted over a data network.

Affinity and Coupon Programs

Because the transaction is tied to the CardFort ID number, the card company can enroll any cardholder in specific affinity or reward programs. Processing the savings and fraud reduction provided by the CardFort system will allow more resources to be available for reward programs.

Age Verification and Account limits

If the card company chooses to it can implement an age verification system with the CardFort registration process. This is a substantial benefit to merchants and cardholders. Merchants can sell products and services to buyers who need to be of a certain maximum or minimum age, by law or policy. Cardholders verify their age with card companies when they apply for a credit line and register with the CardFort system. Thus, the cardholder's age is associated with his/her CardFort user ID. As a result, purchases can be checked for age verification before being approved. Cardholders can have different user IDs assigned to their children, so that attempted purchases from those user IDs not meeting the minimum age requirements would fail. The same system of multiple user IDs applies to creating account limits for IDs assigned to children, or for example, company employees.

Merchant Selection

The card company can choose to register some merchants and not others based on its policies. Merchants who are appropriate to make "card presented at time of purchase" sales may not be appropriate to make network sales using the CardFort system.

The present invention provides a method and apparatus for conducting financial transactions over a data network, such as the Internet. It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method of performing a financial transaction allowing a cardholder to make a purchase from a merchant using credit established at a financial institution, the method comprising:

transmitting a merchant offer from the merchant to the cardholder, wherein the merchant offer includes merchant information about the merchant and the purchase;

transmitting at least a portion of the merchant information and cardholder information from the cardholder to the financial institution, wherein the financial institution uses the merchant information and the cardholder information to determine whether the merchant offer and/or the purchase are authorized;

transmitting payment for the purchase from the financial institution to a merchant account; and sending a purchase request from the financial institution to the merchant, the purchase request including at least a portion of the merchant offer and a payment notification, wherein the portion of the merchant offer is used to match up the purchase request with the purchase, and the payment notification is used to indicate that payment for the purchase has been made and that the merchant offer has been accepted, and wherein the purchase request does not contain any information relating to the identity of the cardholder.

2. The method of claim 1, further comprising a step of confirming that the cardholder has enough credit at the financial institution to pay for the purchase.

3. The method of claim 1, further comprising a step of verifying that the merchant is authorized to receive payment for the purchase from the financial institution.

4. The method of claim 1, wherein the payment notification includes a purchase identifier and a cardholder address, and further comprises a step of shipping purchased items from the merchant to the cardholder address.

5. The method of claim 1, wherein the merchant information includes information about the purchase and a merchant identifier.

6. The method of claim 1, wherein the step of sending the purchase request comprise; steps of:

sending a purchase identifier from the financial institution to the merchant; and sending shipping information from the financial institution to the merchant.

7. The method of claim 1 further comprising a step of selecting an item included in the purchase from a merchant website.

8. The method of claim 1 further comprising a step of selecting an item included in the purchase from a merchant catalog.

9. The method of claim 8 wherein the step of transmitting the merchant offer comprises a step of providing merchant information about the item and a merchant identifier in the merchant catalog.

10. The method of claim 9 wherein the step of transmitting the merchant offer comprises a step of providing merchant information about the item and a merchant identifier in a hardcopy of the merchant catalog.

11. The method of claim 9 wherein the step of transmitting the merchant offer comprises a step of providing merchant information about the item and a merchant identifier in an electronic off-line copy of the merchant catalog.

12. A method of operating a financial institution for performing a financial transaction between a cardholder and a merchant, wherein the cardholder makes a purchase from the merchant using credit established at the financial institution, the method comprising:

receiving a request to pay the merchant from the cardholder, the request to pay includes information about the purchase, a merchant identifier and a cardholder identifier;

determining whether the cardholder has sufficient credit established at the financial institution to make the purchase; and if it is determined that the cardholder has sufficient credit, transmitting funds from the financial institution to a merchant account to pay for the purchase; and sending a purchase request from the financial institution to the merchant, the purchase request including at least a portion of the request to pay and a payment notification indicating that payment for the purchase has been made;

wherein the purchase request does not reveal the identity of the cardholder.

13. A method of claim 12 further including a step of assigning the merchant identifier and the cardholder identifier, wherein the merchant and cardholder identifiers are stored at the financial institution and used to identify the merchant and the cardholder from the request to pay.

14. The method of claim 12 further including the step of transmitting a confirmation to the cardholder after notifying the merchant that payment has been made.

15. A method for operating a merchant business for performing a financial transaction between a cardholder and a merchant, wherein the cardholder makes a purchase from the merchant using credit established at a financial institution, the method comprising:

transmitting to the cardholder information about items offered by the merchant and a merchant identifier;

receiving a purchase request from the financial institution, said purchase request including a payment notification indicating that payment for at least one item has been made, wherein the purchase request does not reveal the identity of the cardholder; and delivering the at least one item to a delivery service thereby allowing the delivery service to deliver the at least one item to the cardholder at a shipping address, wherein the shipping address is forwarded to the delivery service from the financial institution without knowledge of the merchant.

16. The method of claim 15 wherein the step of transmitting comprises a step of providing the cardholder information about the items offered and the merchant identifier in a merchant catalog.

17. A method for operating a cardholder computer for performing a financial transaction between a cardholder and a merchant, wherein the cardholder makes a purchase from the merchant using credit established at a financial institution, the method comprising:

obtaining item information and a merchant identifier from the merchant; and transmitting a request to pay from the cardholder computer to the financial institution, the request to pay includes the item information, the merchant identifier and a cardholder identifier and instructs the financial institution to purchase a selected item for the cardholder from the merchant without revealing the identity of the cardholder.

18. The method of claim 17 further comprising the step of receiving confirmation from the financial institution that the selected item has been paid for by the financial institution.

19. The method of claim 17 wherein the step of obtaining item information comprises a step of obtaining the item information and the merchant identifier from a data network.

20. The method of claim 17 wherein the step of obtaining item information comprises a step of obtaining item information and the merchant identifier from an off-line electronic catalog.

21. The method of claim 17 wherein the step of obtaining item information comprises a step of obtaining item information and the merchant identifier from a hardcopy catalog.

22. The method of claim 17 further comprising a step of recording the transaction in a cardholder purchase log.

23. Apparatus for use by a cardholder for conducting a financial transaction between the cardholder and a merchant, wherein the cardholder makes a purchase from the merchant using credit established at a financial institution, the apparatus comprising:
- means for selecting an item to be purchased from the merchant;
- means for receiving information about the selected item including a merchant identifier;
- means for combining information about the selected item and the merchant identifier with cardholder information including a cardholder identifier, wherein a request to pay is created; and
- means for transmitting the request to pay from the cardholder to the financial institution to instruct the financial institution to purchase the selected item for the cardholder without revealing the identity of the cardholder.

24. The apparatus of claim 23 further comprising:
- means for receiving an order confirmation; and
- means for recording information about the purchase in a cardholder purchase log.

25. Apparatus for use by a merchant for conducting a financial transaction between a cardholder and the merchant, wherein the cardholder makes a purchase from the merchant using credit established at a financial institution, the apparatus comprising:
- means for transmitting to the cardholder information about at least one item offered for sale by the merchant and a merchant identifier; and
- means for receiving a purchase request from the financial institution, said purchase request includes a request to purchase the at least one item from the merchant and a payment notification indicating that payment for the at least one item has been made.

26. The apparatus of claim 25 further comprising means for recording information about the purchase in a merchant purchase log.

27. Apparatus for use by a financial institution for conducting a financial transaction between a cardholder and a merchant, wherein the cardholder makes a purchase from the merchant using credit established at the financial institution, the apparatus comprising:
- means for transmitting a request to pay the merchant from the cardholder to the financial institution, the request to pay includes information about the purchase, a merchant identifier and a cardholder identifier;
- means for determining if the cardholder has sufficient credit established at the financial institution to make the purchase;
- means for transmitting funds from the financial institution to a merchant account to pay for the purchase; and
- means for sending a purchase request from the financial institution to the merchant, said purchase request includes a request to make the purchase from the merchant and includes a payment notification indicating that payment for the purchase has been made.

28. The apparatus of claim 27 further comprising means for providing an order confirmation to the cardholder.

29. The apparatus of claim 27 further further comprising means to record the transaction in a financial institution purchase log.

30. A computer software product for use by a purchasing processor operated by a cardholder, the computer software product for conducting a financial transaction between the cardholder and a merchant, wherein the cardholder makes a purchase from the merchant using credit established at a financial institution, the computer software product includes a medium readable by the purchasing processor, the medium having stored thereon:
- a first sequence of instructions which, when executed by said purchasing processor, causes said purchasing processor to receive information about the purchase and a merchant identifier; and
- a second sequence of instructions which, when executed by said purchasing processor, causes said purchasing processor to transmit a request to pay to the financial institution, the request to pay includes the information about the purchase, the merchant identifier and a cardholder identifier and instructs the financial institution to purchase a selected item for the cardholder.

31. The medium of claim 30 further comprising:
- a third sequence of instructions which, when executed by said purchasing processor, causes said purchasing processor to receive confirmation information about the purchase; and
- a fourth sequence of instructions which, when executed by said purchasing processor, causes said purchasing processor to store the confirmation information in a purchasing log on the purchasing processor.

32. A method of performing a financial transaction allowing a cardholder to make a purchase from a merchant using credit established at a financial institution, the method comprising:
- transmitting a merchant offer from the merchant to the cardholder, wherein the merchant offer includes merchant information about the merchant and the purchase;
- transmitting the merchant information and cardholder information from the cardholder to the financial institution;
- transmitting payment for the purchase from the financial institution to a merchant account;
- sending a purchase request from the financial institution to the merchant, said purchase request including a payment notification indicating that payment for the purchase has been made;
- sending to the selected shipper, a cardholder address and information about the merchant and items associated with the purchase;
- providing items associated with the purchase from the merchant to the selected shipper, wherein the items are to be shipped by the selected shipper; and
- shipping the items from the selected shipper to the cardholder at the cardholder address.

33. A method of performing a financial transaction allowing a first cardholder to make a purchase from a second cardholder using credit established at a financial institution, the method comprising:
- transmitting an offer from the second cardholder to the first cardholder, wherein the offer includes information about the second cardholder and the purchase;

transmitting at least a portion of the offer and first cardholder information from the first cardholder to the financial institution;

transmitting payment for the purchase from the financial institution to an account of the second cardholder; and sending a purchase request from the financial institution to the second cardholder, said purchase request including a payment notification indicating that payment for the purchase has been made and that the second cardholder offer has been accepted.

34. A method of performing a financial transaction allowing a first party to make a purchase from a second party using credit established at a financial institution, the method comprising:

transmitting an offer from the second party to the first party, wherein the offer includes information about the second party and the purchase;

transmitting at least a portion of the information about the second party and information about the first party from the first party to the financial institution, wherein the financial institution uses the information about the second party and the information about the first party to determine whether the offer and/or the purchase are authorized;

transmitting payment for the purchase from the financial institution to an account belonging the second party; and sending a purchase request from the financial institution to the second party, the purchase request including at least a portion of the offer and a payment notification, wherein the portion of the offer is used to match up the purchase request with the purchase, and the payment notification is used to indicate that payment for the purchase has been made and that the offer has been accepted, and wherein the purchase request does not contain any information relating to the identity of the first party.

35. The method of claim 34 wherein the first party is a cardholder and the second party is a merchant.

36. The method of claim 34, further comprising a step of confirming that the first party has enough credit at the financial institution to pay for the purchase.

37. The method of claim 34, further comprising a step of verifying that the second party is authorized to receive payment for the purchase from the financial institution.

38. The method of claim 34, wherein the payment notification includes a purchase identifier and a first party address, and further comprises a step of shipping purchased items from the second party to the first party address.

39. The method of claim 34, wherein the step of sending the purchase request comprises steps of:

sending a purchase identifier from the financial institution to the second party; and sending shipping information from the financial institution to the second party.

* * * * *